United States Patent [19]

Worthington et al.

[11] Patent Number: 5,514,925
[45] Date of Patent: May 7, 1996

[54] MAGNETIC FEEDTHROUGH MANIPULATOR

[75] Inventors: James N. Worthington, Port Townsend; Richard D. Killam, Port Hadlock, both of Wash.

[73] Assignee: Thermionics Northwest, Inc., Port Townsend, Wash.

[21] Appl. No.: 516,134

[22] Filed: Aug. 17, 1995

[51] Int. Cl.$^6$ .................................................. H02K 49/00
[52] U.S. Cl. ........................................ 310/103; 310/75 D
[58] Field of Search ................................ 310/66, 67 R, 310/75 D, 96, 103, 104; 464/29; 294/65.5; 335/302–306

[56] References Cited

U.S. PATENT DOCUMENTS 3,157,808 11/1964 Lloyd ........................................ 310/104
3,936,683 2/1976 Walker ...................................... 310/103
4,197,474 4/1980 Honigsbaum ............................. 310/104

Primary Examiner—Leo P. Picard
Assistant Examiner—Raymond M. Barrera
Attorney, Agent, or Firm—Linval B. Castle

[57] ABSTRACT

A magnetic feedthrough manipulator adapted to be sealed to a chamber for inserting a manipulator shaft capable of rotational and longitudinal movement. The shaft is axially coupled to a ferromagnetic armature having an even number of longitudinal surface splines freely movable within a nonmagnetic tubular housing and which is controlled by alternately polarized magnets in a frame that slides and rotates on the outer surface of the housing. Two or more manipulator shafts may be controlled independently by a like number of armatures in the same housing.

10 Claims, 3 Drawing Sheets

MAGNETIC FEEDTHROUGH MANIPULATOR

This invention relates generally to a laboratory accessory and in particular to a magnetically coupled feedthrough for controlling the position of an object in a chamber.

BRIEF SUMMARY OF THE INVENTION

There are many different types of devices for positioning and manipulating an object in a chamber such as a bell jar or vacuum chamber. These positioning and manipulating devices range from the simple, comprising a magnet on each surface of a glass bell jar which can control only rotation, to a complex robotic manipulator that can move an object into any position in the chamber.

The manipulator to be described is a sealed unit attached to a chamber port and has a manipulator shaft or a shaft with one or more coaxial manipulator shafts that are individually rotatable and longitudinally movable. The manipulator shafts are driven by a unique magnetic system having magnets outside of the shaft housing acting on an armature within the housing and attached to the shaft. Positioning the magnets out of a chamber that may be used for vacuum test thus eliminates all the outgassing problems associated with placing the magnets in a vacuum. The system employed provides a strong magnetic coupling and permits the feedthrough manipulator to exert force. Thus, a feedthrough manipulator having two separate armatures coupled to a manipulator shaft and a coaxial shaft and driven by two hand driven magnet assemblies gives more flexibility.

DESCRIPTION OF THE DRAWINGS

In the drawings that illustrate the preferred embodiment of the invention.

DESCRIPTION OF THE PREFERRED EMBODIMENT

The feedthrough manipulator to be described is to be attached to a chamber or to an antechamber coupled to a larger chamber and into which samples are deposited for introduction into the larger chamber. Hence, the length of the manipulator illustrated will depend upon the requirements of the user.

Figure 1:
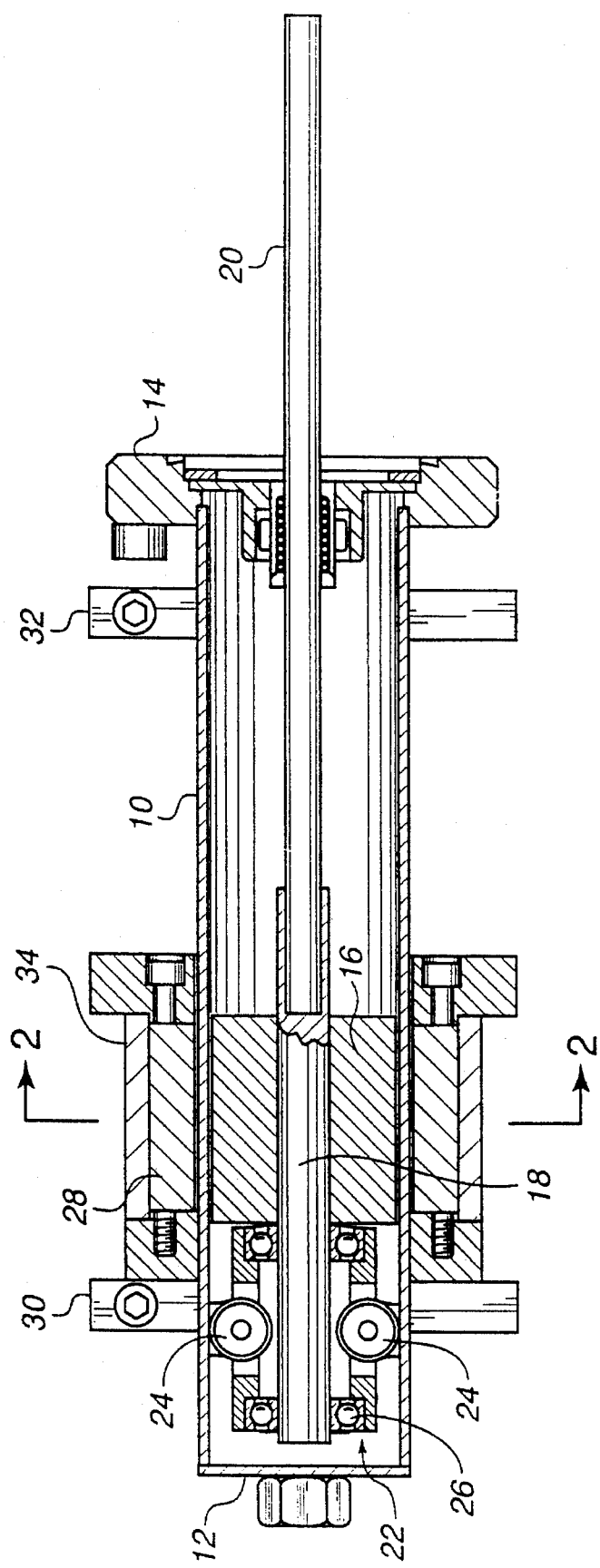
FIG. 1 is a sectional view illustrating a magnetic feedthrough manipulator.

FIG. 1 is a sectional view illustrating a preferred form of the manipulator and shows a tubular housing 10 of nonmagnetic material, such as nonmagnetic stainless steel, closed at a first end 12 and having at the second end 14 a sealing and attachment fixture for connecting the feedthrough manipulator to an airtight chamber.

Within the smooth bore of the tubular housing 10 is an armature carriage supporting a ferromagnetic armature 16 to be later described in detail. The armature is on a central rod 18 in an axial opening through the armature and is suspended in the bore, slightly spaced from the inside wall of the housing, by the elongated manipulator shaft 20 which is mounted in bearings in the end 14 and the carriage 22. The carriage comprises four (only two are shown) bearings 24 acting as wheels that ride on the inside wall of housing 10.

The wheel bearings 24 are separated from the armature supporting rod 18 by a pair of bearings 26 which engage the rod 18.

Thus, if there were no external magnetic influences on the armature, the armature 16, the rod 18 and manipulator shaft 20 could be rotated freely or moved longitudinally within the housing 10.

A plurality of small rare-earth bar magnets 28 clamped in a frame are rotatable and slideable along the outer surface of the non-magnetic tubular housing 10 between the stops 30,32. The magnets are enclosed in a flux return yoke 34. The rotation and longitudinal movement of the magnet assembly surrounding the housing is magnetically transmitted to the armature which, in turn, controls the positioning of the manipulator shaft 20 to which may be attached a specimen for testing in a chamber.

Figure 2:
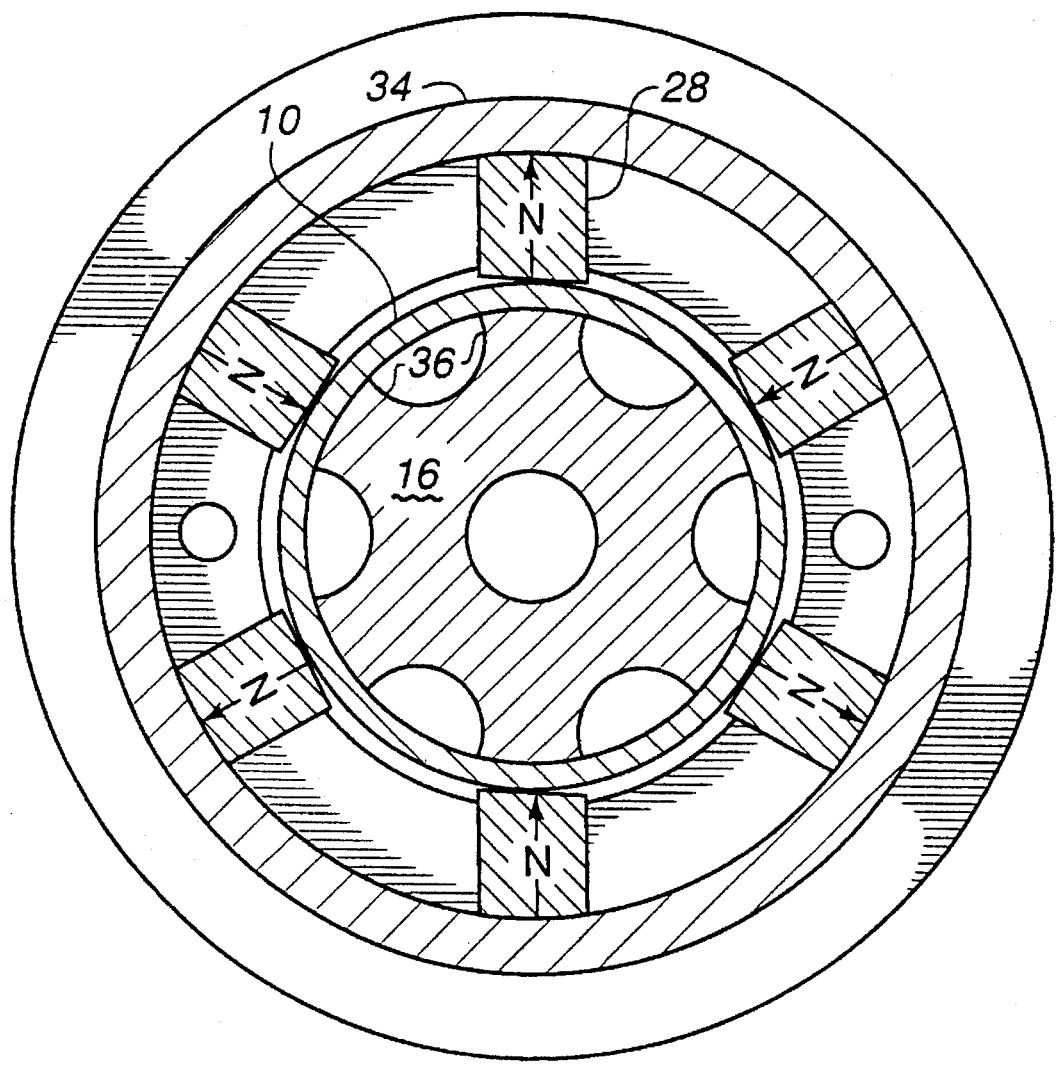
FIG. 2 is a sectional end view illustrating the details of the control armature and the exterior magnets taken along the line 2—2 of FIG. 1.

FIG. 2 is a view taken along the lines 2—2 of FIG. 1 and is an enlarged view of the armature 16 within the nonmagnetic housing 10 and the bar magnets 28 with their flux return yoke 34 outside the housing 10. Armature 16 is formed of a magnetic material selected for the application of the feedthrough manipulator. If for ultra-high vacuum (UHV) application the material of the armature is selected for its magnetic and UHV properties. Magnetic stainless steel (400 series) is a good armature material. If for chemical application the reactivity of the material would become a factor.

The armature 16 is cylindrical with an even number of evenly spaced longitudinal splines 36 in the surface, preferably formed by milling longitudinal slots having semicircular cross sections; six splines 36 are shown. The end surfaces of the splines are arcuate to conform to the inside wall of the housing 10; the spline ends are very close, but are not touching the inside surface of the housing so that the armature may freely rotate and move within the housing 10.

Located close to the outside surface of the housing 10 are an equally even number of small rare-earth bar magnets 28 encased within a flux return yoke 34. The magnets are arranged so that the polarities are alternately adjacent the surfaces of housing 10 and the flux return yoke 34 as shown by the small arrows in each magnet in FIG. 2. In this way, the magnetic flux will pass from a magnet through the housing, armature and back through an adjacent magnet and through the flux return yoke to the point of beginning. Thus, each pair of bar magnets, together with the armature and flux return yoke, form a very strong "horseshoe" magnet for revolving and moving the manipulator shaft 20.

Figure 3:
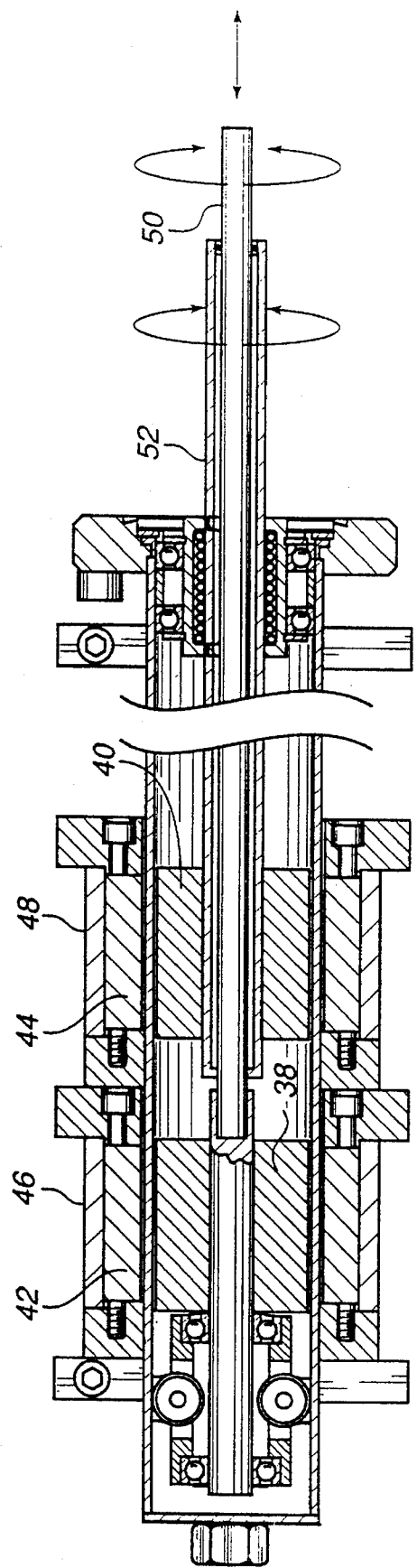
FIG. 3 is a sectional view of a double manipulator.

FIG. 3 is a sectional view of a dual control feedthrough manipulator built as described in FIG. 1 except that the embodiment shown in FIG. 2 has two armatures 38, 40 manipulated by two groups of rare-earth bar magnets 42, 44 in their flux return yokes 46, 48 to independently rotate or longitudinally move a manipulator shaft 50 and a coaxial manipulator shaft 52 that is around shaft 50. Because the manipulator shafts 50 and 52 must operate separately and independently of each other, there are bearings between them and a larger bearing system for the coaxial shaft 52.

It is apparent that triple feedthroughs and even more complex magnetic feedthrough manipulators can be made using the hollow armature and passing the shafts down through the hollow armatures along with the sliding external magnets and return yokes described.

We claim:

1. A magnetic feedthrough manipulator for controlling the position of a sample in a chamber, said manipulator comprising:

a tubular housing of nonmagnetic material, said housing being sealed at a first end and adapted for communication with the chamber at a second end, said housing having a smooth bore;

a manipulator shaft extending from said second end of said housing, said shaft passing through said second end and being mounted in bearings permitting said shaft rotational and longitudinal movement;

at least one cylindrical shaped ferromagnetic armature within the bore of said nonmagnetic housing and coupled to an end of said manipulator shaft said armature being rotatable and longitudinally movable within the bore of said housing, said cylindrical armature having an even number of evenly spaced longitudinal splines in its surface; and a frame encircling the exterior of said housing, said frame being rotatable and longitudinally movable on said housing, said frame supporting a flux return yoke and a plurality of bar magnets positioned between said yoke and said housing, said plurality of bar magnets corresponding in number to said armature spines and being alternately polarized.

2. The manipulator claimed in claim 1 wherein said armature splines have arcuate end surfaces conforming to, but not contacting the inside wall of said housing.

3. The manipulator claimed in claim 1 wherein said armature has six splines and said frame has six alternately polarized magnets.

4. The manipulator claimed in claim 2 wherein said magnets are rare-earth magnets.

5. The manipulator claimed in claim 2 wherein said armature is formed of magnetic stainless steel.

6. The manipulator claimed in claim 1 wherein said housing is formed of nonmagnetic stainless steel.

7. The manipulator claimed in claim 6 wherein said second end of said housing includes means for sealing said housing to a chamber.

8. The manipulator claimed in claim 1 wherein said manipulator shaft is supported by bearings in the second end of said housing.

9. The manipulator claimed in claim 1 wherein said housing contains first and second armatures, and wherein said manipulator shaft comprises a hallow manipulator shaft and a solid manipulator shaft, said second armature being coupled to said manipulator shaft that is hollow and extends through said second armature, the first armature being coupled to said solid manipulator shaft that extends through the center of said second armature and said hollow shaft.

10. The manipulator claimed in claim 9 wherein said first armature is supported on bearings that permit rotation and longitudinal movement of said first armature within said housing, and wherein said second armature is supported by bearings on said solid manipulator shaft permitting independent rotational and longitudinal movement of said second armature.

* * * * *